Sept. 28, 1926.

J. F. REAVIS

GRAIN CIRCULATOR

Filed June 12, 1925

Witnesses:—
W. A. Williams
M. G. Olean

John F. Reavis
INVENTOR.

BY Munn &Co.
ATTORNEYS.

Sept. 28, 1926.

J. F. REAVIS

GRAIN CIRCULATOR

Filed June 12, 1925   2 Sheets-Sheet 2

1,601,224

John F. Reavis
INVENTOR.

Patented Sept. 28, 1926.

1,601,224

UNITED STATES PATENT OFFICE.

JOHN FREDERIC REAVIS, OF BAGUIO, PHILIPPINE ISLANDS.

GRAIN CIRCULATOR.

Application filed June 12, 1925. Serial No. 36,762.

My present invention relates generally to grain circulators, and more particularly to apparatus for storage bins of grains, meal, seeds and other granular substances which tend to heat and deteriorate when in bulk, and my primary object is the provision of a simple effective apparatus readily attachable to bins and storage chambers of various characters whereby the granular material of whatever particular nature may be circulated, and in the course of such circulation, cooled and aerated in order to prevent over-heating and avoid deterioration.

Another object of my present invention is the provision of an apparatus of the above character which will be simple and inexpensive in first cost as well as in upkeep, which will be strong and durable, which may be easily and quickly installed and which will be uniformly effective and efficient in use.

In the accompanying drawings which illustrate my present invention and form a part of this specification;

Figures 1, 2:
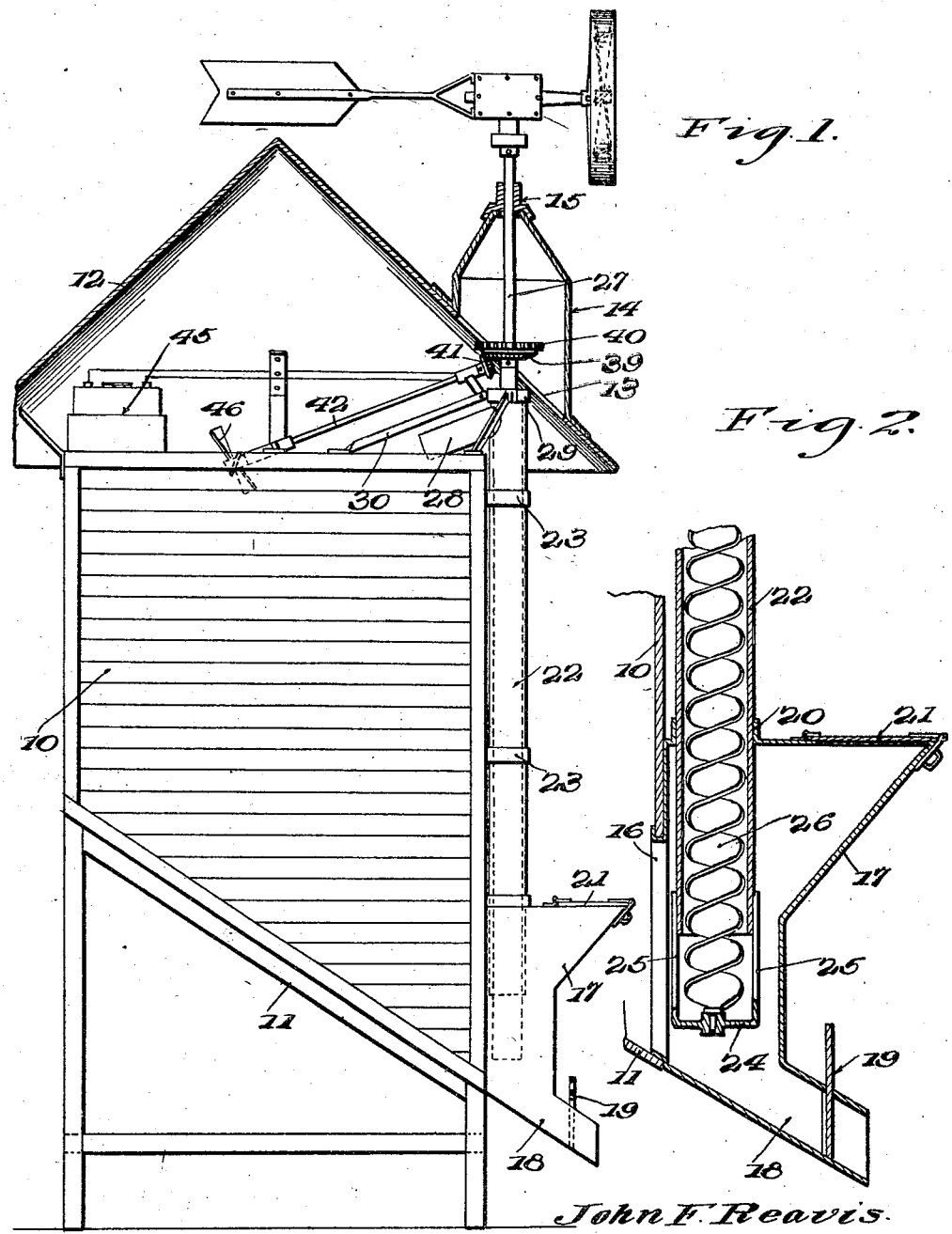
Figure 1 is a side view, partly in elevation and partly in section, illustrating the practical application of my invention.
Figure 2 is an enlarged vertical section through the lower portion thereof.
Figure 3:
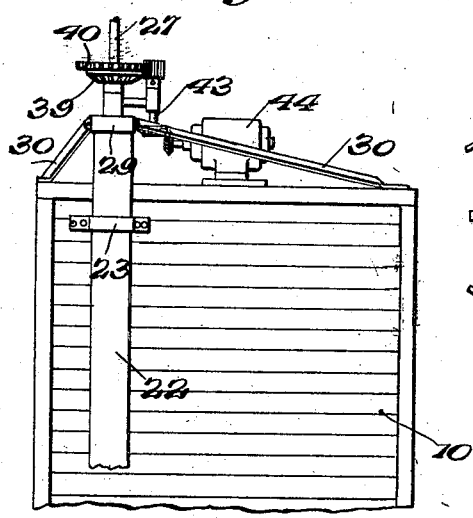
Figure 3 is a partial front elevation with the roof removed.

Referring now to these figures I have shown in Figures 1 and 3 a bin or storage box 10 for grains, meal, seed and like granular materials having a forwardly and downwardly inclined bottom 11 although this is not essential to operation of my invention. In Figure 1 I have shown the bin or storage box 10 provided with a roof 12 which, according to my improvements, has an opening 13 at its front surmounted by a hood 14 provided at its top with a centrally located bearing block 15.

At its lower front portion the bin or storage box 10 has an opening 16 and I propose to mount on the lower front portion a circulating box 17, preferably formed of sheet metal and attached to the front of the bin around the opening 16. This box 17 also preferably has a lower downwardly inclined delivery spout 18 in which a shut off gate 19 is mounted and has an upper rear opening 20 and an upper forward hinged lid 21.

Depending with the circulating box 17 is the lower end of a grain circulating tube 22 which upstands along the front wall of the bin 10 and is preferably attached thereto by means of anchor bands or straps 23. The lower end of this tube within the circulating box 17 is open above a bearing piece 24 attached thereto by straps 25, piece 24 serving as a bearing for the lower end of a conveyor screw 26 upstanding within the tube 22 for substantially its full length.

The screw 26 has at its upper end a shaft 27 projecting through and above the upper closed end of the circulating tube 22, and the screw itself extends to a rearwardly and downwardly inclined discharge spout 28 carried by the tube 22 adjacent to its upper end. Around the upper end of tube 22 is secured a crown band 29 and from this band attaching arms 30 radiate and are secured to adjacent portions of the bin 10 so as to cooperate with the anchor bands in rigidly and permanently securing the circulating tube in proper position.

Figure 4:
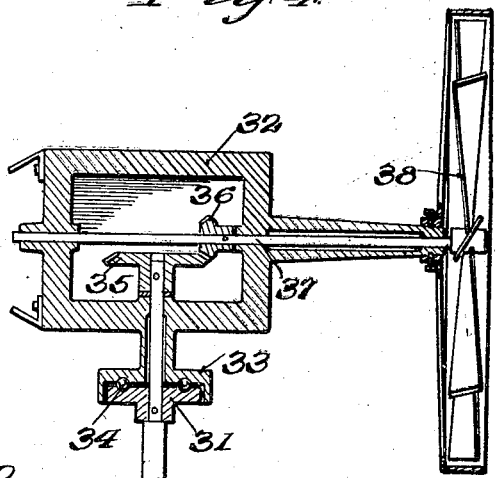
Figure 4 is an enlarged detail section through the wind wheel frame.

The upstanding shaft 27 projects through, and has bearing in the bearing block 15 of the hood 14 and above said bearing block is provided with a rigid collar 31 as most plainly seen in Figure 4 which receives the wind wheel frame 32 rotatably mounted on the shaft and having a bearing plate 33 engaging the collar 31 with interposed antifriction bearings 34. Within the frame 32 shaft 27 has a gear wheel 35 engaging the gear wheel 36 of the wind wheel shaft 37 having the wind wheel 38 upon one end.

Below the hood 14 the shaft 27 may have gear wheels 39 and 40, the former in connection with a gear 41 at the upper forward end of the inclined fan shaft 42 and the latter in connection through an intermediate shaft 43 with the shaft of a generator 44 by which to utilize the excess power of the wind wheel 38 for some useful purpose as for instance the recharging of a battery 45.

The fan shaft 42 has a fan 46 at its lower rear end within the upper end of the bin 10 so that during operation a blast of cooling air will be directed downwardly into the bin especially over the material discharged through the spout 28 at the upper end of the circulating tube 22.

In operation, the material within the bin finds its way by gravity into the lower circulating box 17 and is there taken up by the lower end of the screw 26. In this way the material is carried upwardly within the circulating tube 22 and is finally discharged into the upper end of the bin through the discharge spout 28.

Figure 5:
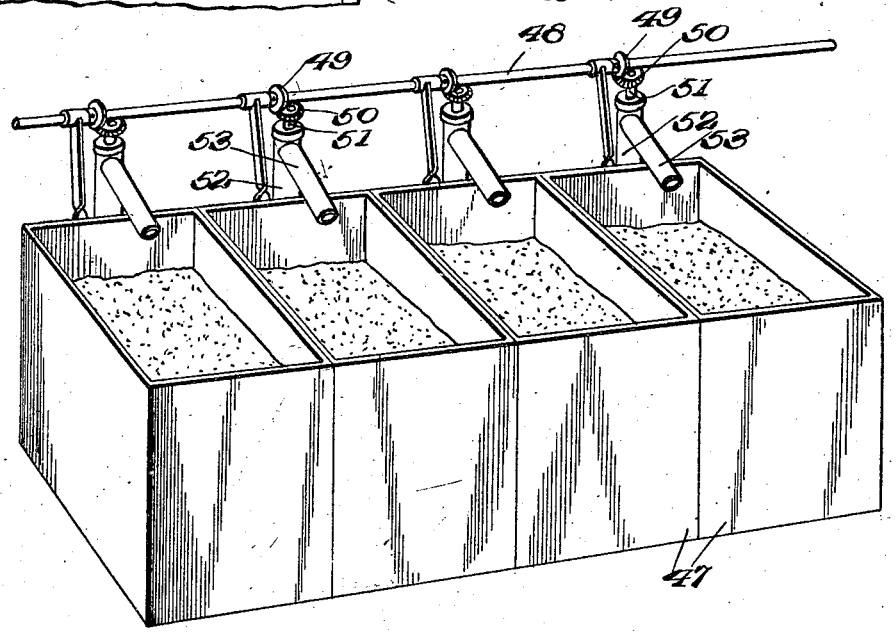
Figure 5 is a perspective view illustrating a modification or extension of the apparatus shown in Figures 1 to 4 inclusive.

My invention may be utilized in battery form in connection with a series of adjacent bins 47 as shown in Figure 5, in which case the wind wheel is suitably geared and connected to a shaft 48 extending along the several bins and having gears 49 engaging the upper gears 50 of the several screw shafts 51, one for each of the bins. Like the screw 26, the screws connected to shafts 51 operate in circulating tubes 52 having upper discharge spouts 53 opening into the bins 47. Otherwise the structure incident to each circulating tube 52 is the same as that previously described in connection with the single circulating tube 22, the material of each bin 47 being of course independently circulated.

I claim:

1. The combination with a storage bin for granular material having a lower outlet, of a box secured to cover the outlet, a tube rising from said box and secured along the bin having a discharge spout opening into the bin, a conveyor screw extending upwardly within the tube from said box, and means for rotating said screw.

2. The combination with a storage bin for granular material having a lower outlet, of a box secured to cover the outlet, a tube rising from said box and secured along the bin having a discharge spout opening into the bin, a conveyor screw extending upwardly within the tube from said box, a shaft extending from the upper end of the screw above the tube, and a wind wheel mounted on and operatively connected to said shaft.

3. The combination with a storage bin for granular material having a lower outlet, of a box secured to cover the outlet, a tube rising from said box and secured along the bin having a discharge spout opening into the bin, a conveyor screw extending upwardly within the tube from said box, a shaft extending from the upper end of the screw above the tube, a fan shaft geared to said screw shaft and inclined downwardly into the bin, a fan on said shaft, and means for rotating the screw shaft.

4. The combination with a storage bin for granular material having a lower outlet, of a box secured to cover the outlet, a tube rising from said box and secured along the bin having a discharge spout opening into the bin, a conveyor screw extending upwardly within the tube from said box, and means for rotating said screw, said box having a valve discharge spout at its base and an upper hinged cover as described.

5. The combination with a storage bin for granular material, of a circulating device therefor including means for receiving material from the bottom of the bin, means for conveying the material from said first named means upwardly to, and discharging the same within, the top of the bin, and means for cooling the grain so discharged into the bin.

6. The combination with a storage bin for granular material, of a circulating device therefor including means for receiving material from the bottom of the bin, means for conveying the material from said first named means upwardly to, and discharging the same within, the top of the bin, and a fan actuated by the conveying means and disposed and operating within the upper portion of the bin.

7. In combination with a storage receptacle for granular material, of a circulating device therefor including means for receiving material from the bottom of the receptacle, means for conveying the material from the first named means upwardly to and discharging the same within, the top of the receptacle, and a wind wheel operatively connected to said conveying means.

JOHN FREDERIC REAVIS.